C. BURNS.
CHUTE FOR WAGONS.
APPLICATION FILED APR. 23, 1917.
1,285,924.
Patented Nov. 26, 1918.
2 SHEETS—SHEET 1.
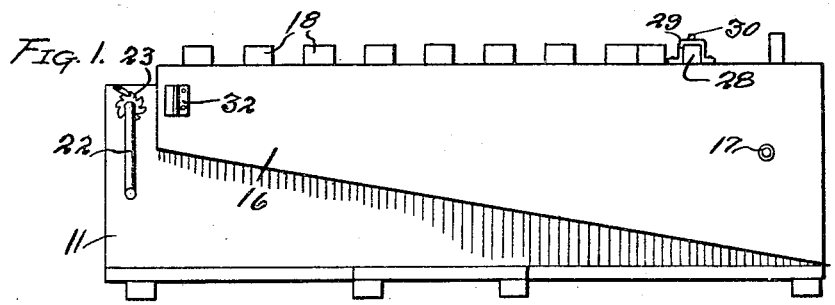
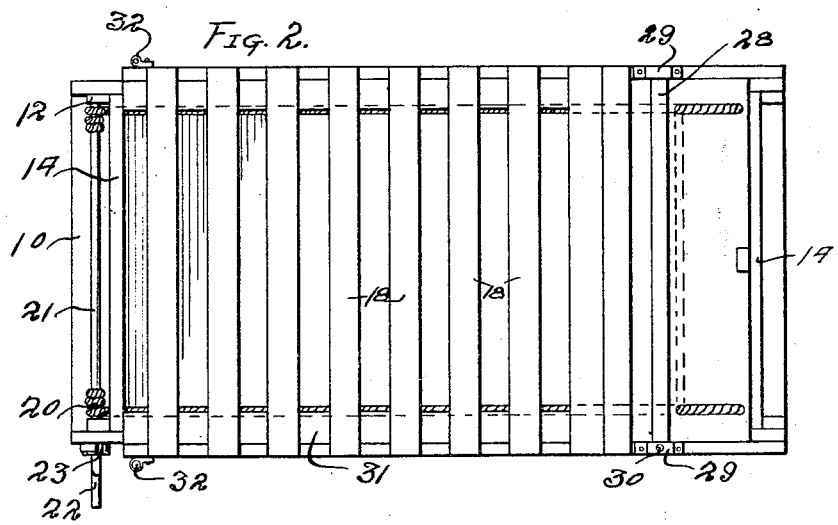
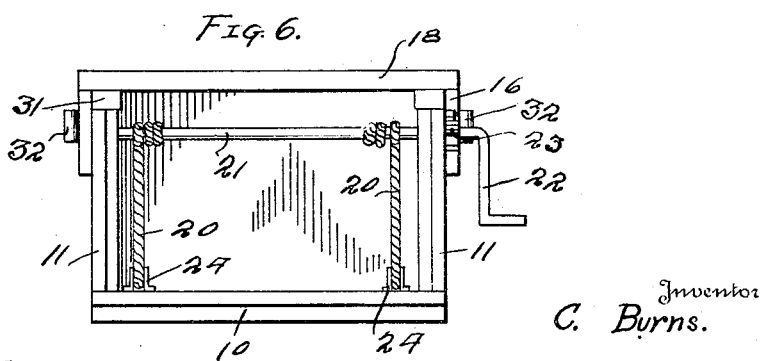

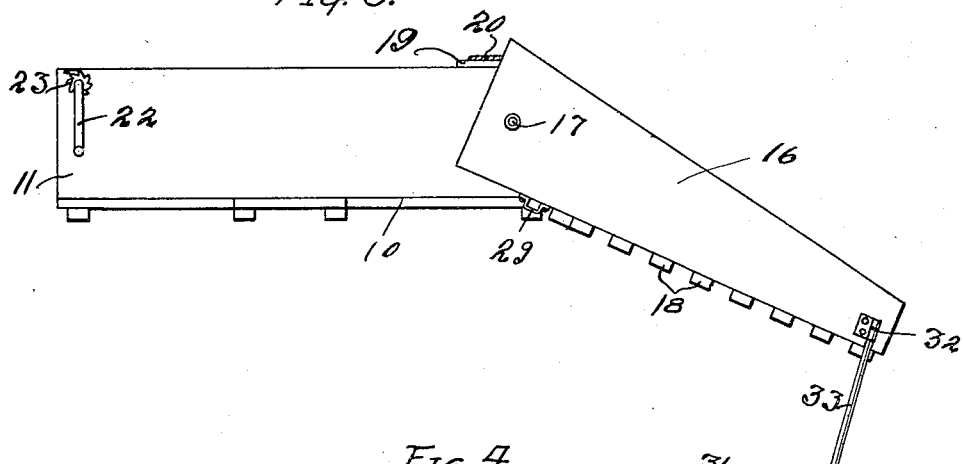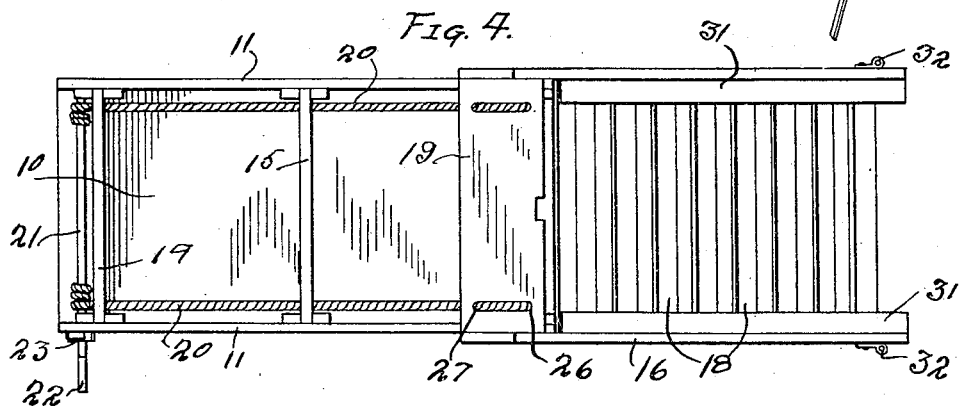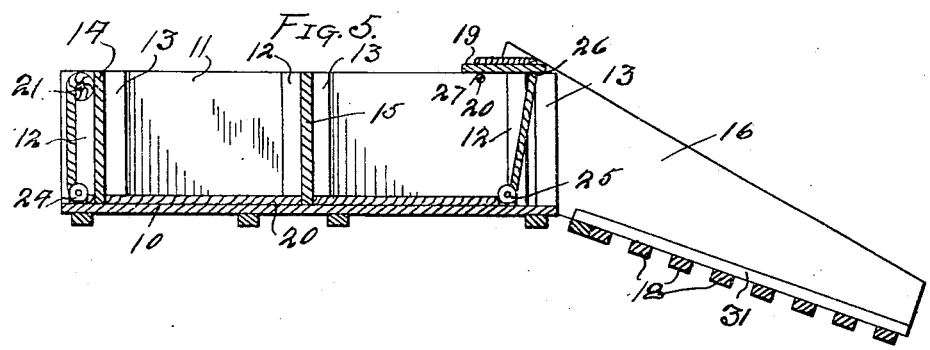

UNITED STATES PATENT OFFICE.

CHARLEY BURNS, OF AVONDALE, COLORADO.

CHUTE FOR WAGONS.

1,285,924. Specification of Letters Patent. Patented Nov. 26, 1918.

Application filed April 23, 1917. Serial No. 163,930.

*To all whom it may concern:*

Be it known that I, CHARLEY BURNS, a citizen of the United States, residing at Avondale, in the county of Pueblo, State of Colorado, have invented certain new and useful Improvements in Chutes for Wagons; and I do hereby declare the following to be a full, clear, and exact description of the invention, such will enable others skilled in the art to which it appertains to make and use the same.

This invention is an improvement in loading and unloading apparatus and has particular reference to an adjustable chute for wagon bodies.

An object of the invention is the provision of an improved adjustable chute employed to facilitate the loading of hogs and other animals into a wagon and adjustable to a position where the same will form a closure for the top of the wagon.

Another object is the provision of a device of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a side elevation of a wagon showing the chute attached thereto and in a position to form a closure for the top of the wagon.

Fig. 2 is a top plan view.

Fig. 3 is a side elevation with the chute in a lowered position.

Fig. 4 is a top plan view with the chute in lowered position.

Fig. 5 is a longitudinal sectional view.

Fig. 6 is an end elevation.

Referring more particularly to the accompanying drawing the numeral 10 indicates a wagon body which may be of any preferred construction, the sides 11 of which are provided with end and intermediate vertical guide strips 12 and 13 respectively for receiving therebetween the removable end gates 14 at the front and rear of the wagon body and the intermediate removable partition 15 for dividing the wagon body into front and rear compartments whereby loads of different natures may be carried therein.

The chute 16 is preferably pivoted to the sides 11 of the wagon body adjacent their rear ends by means of the pivot bolts 17 which may be removed in order to detach said chute, if desired. The bottom of the chute is formed of a plurality of transverse strips 18 which extend to a point adjacent the pivot end of the chute thus leaving a space, when the chute is in the position shown in Fig. 1, between the rear end gate 14 and the nearest strip 18. In order to prevent any possible escape of an animal from the rear compartment this space is preferably closed by a plate 19 the ends of which rest upon the top of the sides 11, said plate being interposed between the rear end gate 14 and the said nearest strip 18 when the chute is in the position shown in Fig. 1. The plate 19 is retained in its closing position by means of the rope or cable 20 the ends of which are secured and wound about a rotatable shaft 21 mounted in the sides 11 of the wagon body at the forward end thereof, said shaft having a crank handle 22 for rotating the same to wind said cable thereupon and also having a ratchet 23 associated therewith for locking said shaft in an adjusted position. The ends of the cable extend downwardly from the shaft 21 and pass around the pulleys 24 carried by the bottom of the wagon body and then extend longitudinally of the sides 11 and beneath the partition 15. At the rear ends of the sides 11 the said cable passes around the pulleys 25 and thence upwardly through the openings 26 in the plate 19. The cable then extends transversely of each end of the plate 19 and passes downwardly through the other opening 27 formed therein and thence longitudinally of the inner edge of said plate. It will thus be seen that by rotating the shaft 21 to wind the cable 20 thereon, a downward pull will be exerted upon the plate 19 and the ratchet 23 will releasably retain the plate in locked position. In order to further lock the plate in closing position a bar 28 is mounted in the brackets 29 carried by the sides of the chute, said bar extending across the top of said plate and being secured in this position by means of a pin 30 extending through one of said brackets 29 and the adjacent end of said bar. In order to lower the chute so as to load or unload the wagon, the locking bar 28 and the rear end gate 14 are removed and the shaft 21 released so as to slacken the tension upon the cable 20 and permit the plate 19 to be moved toward the rear ends of the sides and away from the strip 18 nearest the pivot 17. The chute 16 may then be swung to the position shown in Fig. 3 at which time the innermost ends of the brace bars 31 of the chute will engage the bottom of the wagon body. The sides of the chute adjacent the free ends thereof are provided with the brackets 32 for receiving anchoring pins 33 which are extended through said brackets and project into the ground when the chute is in the position shown in Fig. 3 in order to prevent accidental movement of the chute or wagon body.

The plate 19, in addition to providing a closure, is further utilized as a pusher element when loading hogs into the wagon and, in this instance the plate is placed in back of a hog on the chute and by winding the cable 20 upon the shaft 21 it will be apparent that the plate will be drawn toward the upper end of the chute and thus assist the hog in ascending the same into the wagon.

What is claimed is:—

1. The combination of a wagon body, a chute pivoted at one end thereof and including transverse strips, an end gate mounted in said end of the body, a combined closure and pusher plate interposed between said end gate and the adjacent strip of said chute and supported upon the sides of said body, and a windlass mechanism for retaining said plate in closing position and drawing the same upwardly on said chute when the plate is used as a pushing element.

2. The combination of a wagon body, a chute pivoted at one end thereof and including transverse strips, an end gate mounted in said end of the body, a combined closure and pusher plate interposed between said end gate and the adjacent strip of said chute and supported upon the sides of said body, a windlass mechanism for retaining said plate in closing position, and drawing the same upwardly along said chute when the plate is used as a pushing element, brackets carried by said chute, and a locking bar detachably mounted in said brackets and extending across the top of said plate.

In testimony whereof, I affix my signature in the presence of two witnesses.

CHARLEY BURNS.

Witnesses:
S. S. PACKARD,
C. N. BOXWOOD.